United States Patent
Clerc et al.

(10) Patent No.: US 8,726,723 B2
(45) Date of Patent: May 20, 2014

(54) DETECTION OF AFTERTREATMENT CATALYST DEGRADATION

(75) Inventors: James C. Clerc, Columbus, IN (US); Timothy M. White, Greenwood, IN (US); Melissa Zaczek, Indianapolis, IN (US); Baohua Qi, Columbus, IN (US)

(73) Assignee: Cummins Emission Solutions, Stoughton, WI (US)

( * ) Notice: Subject to any disclaimer, the term of this patent is extended or adjusted under 35 U.S.C. 154(b) by 225 days.

(21) Appl. No.: 13/215,168

(22) Filed: Aug. 22, 2011

(65) Prior Publication Data

US 2012/0067114 A1 Mar. 22, 2012

(51) Int. Cl.
G01M 15/10 (2006.01)

(52) U.S. Cl.
USPC ..................................... 73/114.75

(58) Field of Classification Search
USPC ............... 73/114.69, 114.71, 114.72, 114.75
See application file for complete search history.

(56) References Cited

U.S. PATENT DOCUMENTS

| | | | |
|---|---|---|---|
| 5,237,818 A | 8/1993 | Ishii et al. | |
| 5,367,875 A | 11/1994 | Aboujaoude et al. | |
| 5,526,643 A * | 6/1996 | Mukaihira et al. | 60/276 |
| 5,545,377 A | 8/1996 | Fukaya et al. | |
| 5,628,186 A | 5/1997 | Schmelz | |
| 5,649,420 A * | 7/1997 | Mukaihira et al. | 60/274 |
| 5,682,317 A | 10/1997 | Keeler et al. | |
| 5,896,743 A | 4/1999 | Griffin | |
| 5,929,320 A * | 7/1999 | Yoo | 73/23.31 |
| 5,983,628 A | 11/1999 | Borroni-Bird et al. | |
| 6,050,128 A * | 4/2000 | Hamburg et al. | 73/23.32 |
| 6,131,439 A * | 10/2000 | Hamburg et al. | 73/23.32 |
| 6,882,929 B2 | 4/2005 | Liang et al. | |
| 6,922,985 B2 | 8/2005 | Wang et al. | |
| 6,941,746 B2 | 9/2005 | Tarabulski et al. | |
| 7,021,044 B2 * | 4/2006 | Mukaihira et al. | 60/277 |
| 7,055,313 B2 | 6/2006 | Russell | |
| 7,067,319 B2 | 6/2006 | Wills et al. | |
| 7,093,427 B2 | 8/2006 | van Nieuwstadt et al. | |
| 7,114,326 B2 * | 10/2006 | Mukaihira et al. | 60/277 |
| 7,134,273 B2 | 11/2006 | Mazur et al. | |

(Continued)

FOREIGN PATENT DOCUMENTS

WO   WO 2008149213 A1   12/2008

OTHER PUBLICATIONS

International Search Report and Written Opinion; International PCT Application No. PCT/US2010/024981; Sep. 30, 2010; Cummins Emission Solutions, et al.; 7 pages.

*Primary Examiner* — Eric S McCall

(74) *Attorney, Agent, or Firm* — Foley & Lardner

(57) ABSTRACT

An exemplary embodiment is a system, including an internal combustion engine fluidly coupled to an exhaust gas flowpath, an aftertreatment system disposed in the exhaust gas flowpath, where the aftertreatment system includes a $NO_x$ reduction catalyst. The exemplary system includes a processing subsystem having a controller, where the controller includes modules structured to functionally execute operations for determining a catalyst degradation. The modules include a test conditions module, a testing module, a monitoring module, and a catalyst aging module. The test conditions module interprets a test conditions event occurrence for the $NO_x$ reduction catalyst, the testing module commands a catalyst efficiency test in response to the test conditions event occurrence, the monitoring module interprets operating condition(s) indicative of a $NO_x$ conversion efficiency during the catalyst efficiency test, and the catalyst aging module determines a catalyst aging value in response to the at least one operating condition.

18 Claims, 4 Drawing Sheets

(56) References Cited

U.S. PATENT DOCUMENTS

| | | |
|---|---|---|
| 7,409,821 B2 | 8/2008 | Miura |
| 7,418,816 B2 | 9/2008 | Upadhyay et al. |
| 8,033,168 B2 * | 10/2011 | Katoh et al. ............... 73/114.75 |
| 8,201,443 B2 * | 6/2012 | Wang et al. ............... 73/114.75 |
| 2002/0152745 A1 | 10/2002 | Patchett et al. |
| 2003/0070420 A1 | 4/2003 | Uchida |
| 2004/0175305 A1 | 9/2004 | Nakanishi et al. |
| 2004/0221571 A1 | 11/2004 | Lewis, Jr. et al. |
| 2005/0103099 A1 | 5/2005 | van Nieuwstadt et al. |
| 2006/0242945 A1 | 11/2006 | Wang et al. |
| 2008/0022658 A1 | 1/2008 | Viola et al. |
| 2009/0165440 A1 * | 7/2009 | Sawada et al. ............... 60/276 |
| 2009/0308058 A1 * | 12/2009 | Iida ............................... 60/287 |
| 2012/0067028 A1 | 3/2012 | Clerc et al. |

* cited by examiner

DETECTION OF AFTERTREATMENT CATALYST DEGRADATION

RELATED APPLICATIONS

The present application is a U.S. Patent Application of PCT/US2010/024981 entitled "Detection of Aftertreatment Catalyst Degradation," filed Feb. 23, 2010, which claims priority to U.S. Provisional Patent Application 61/154,563, filed Feb. 23, 2009, both of which are incorporated herein by reference.

BACKGROUND

The technical field generally relates to internal combustion engine aftertreatment systems. Many current powertrain systems include an aftertreatment system in the exhaust of internal combustion engines to meet emissions regulations or to reduce emissions of undesirable exhaust gas constituents. A variety of aftertreatment systems include one or more catalytic components that experience degradation and/or reduced efficiency over time. Efficiency reductions can affect the conversion capability of the catalyst, and can also affect the storage capacity of the catalyst as an adsorption device. Often, the degradation of a catalyst does not introduce symptoms into the system that are ordinarily detectable. Further, detection of catalyst degradation can be complicated by the inclusion of multiple catalysts with differing degradation modes and rates, and by other complications such as cross-reading of multiple constituents by available composition sensors. Therefore, further technological developments are desirable in this area.

SUMMARY

One embodiment is a unique method for determining catalyst degradation. Further embodiments, forms, objects, features, advantages, aspects, and benefits shall become apparent from the following description and drawings.

DESCRIPTION OF THE ILLUSTRATIVE EMBODIMENTS

Figure 1:
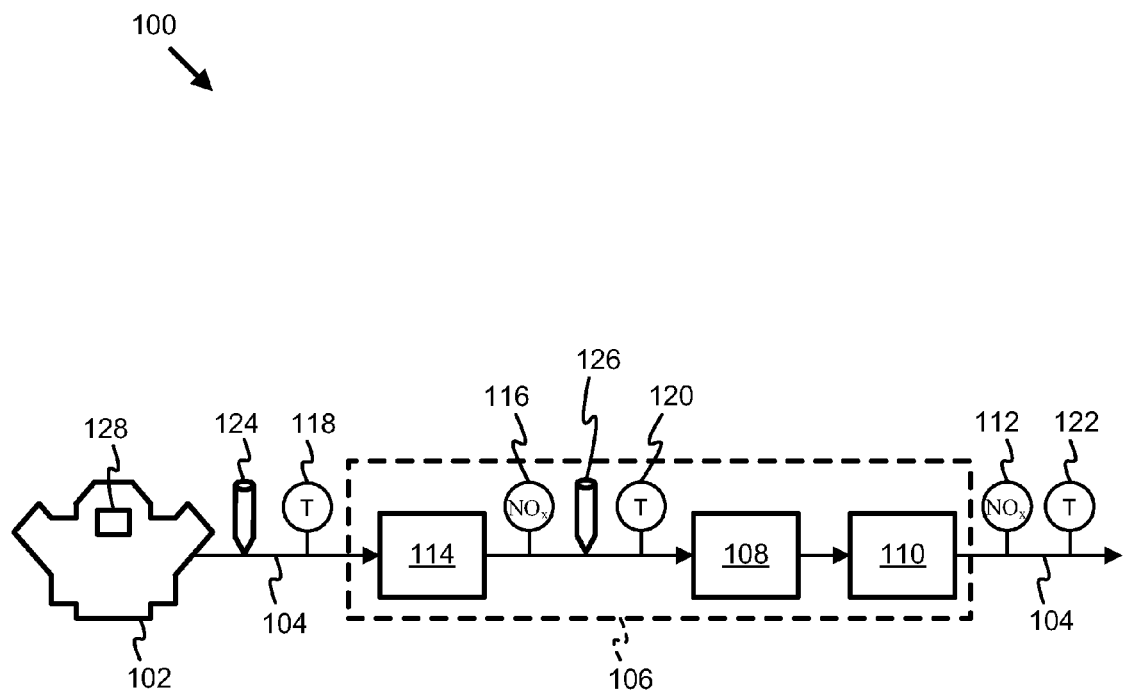
FIG. 1 is a schematic illustration of a system for detecting catalyst degradation.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic illustration of a system 100 for detecting catalyst degradation. The system 100 includes an internal combustion engine 102 fluidly coupled to an exhaust gas flowpath 104, and an aftertreatment system 106 disposed in the exhaust gas flowpath 104. The aftertreatment system 106 includes a $NO_x$ reduction catalyst 108. The aftertreatment system 106 may include any other components known in the art, and the components may be ordered in any arrangement. The illustrated system includes a particulate filter 114 and an ammonia oxidation catalyst 110 that oxidizes ammonia and/or urea slipping through the $NO_x$ reduction catalyst 108.

The system 100 further includes a variety of sensors, including a temperature sensor 118 upstream of the aftertreatment system 106, a temperature sensor 120 between the particulate filter 114 and the $NO_x$ reduction catalyst 108, and a temperature sensor 122 downstream of the aftertreatment subsystem 106. The system 100 further includes a $NO_x$ sensor 116 upstream of the $NO_x$ reduction catalyst 108 and a $NO_x$ sensor 112 downstream of the ammonia oxidation catalyst 110. The selection and location of sensors are not limiting, and any arrangement of sensors, as well as selection of which sensors to include, are understood by those of skill in the art with the benefit of the disclosures herein. The system 100 further includes a reductant injector 126 that injects a reductant (e.g. urea, a hydrocarbon, and/or ammonia) into the exhaust flow 104 upstream of the $NO_x$ reduction catalyst 108. The system 100 further includes an injector 124 that injects hydrocarbons to assist in regenerating the particulate filter 114. The injector 124 may be utilized by the system 100 to generate temperature for the particulate filter 114 or other aftertreatment components, and may be a portion of a control scheme by the entire system 100 to regenerate the particulate filter 114, where the control scheme may include actions by the engine 102 and/or other devices in the system 100.

The exemplary system 100 further includes a controller 128 structured to perform certain operations to determine catalyst degradation. The controller 128 forms a portion of a processing subsystem including one or more computing devices having memory, processing, and communication hardware. The controller 128 may be a single device or a number of distributed devices, and the functions of the controller may be performed by hardware or software. The controller 128 includes one or more modules structured to functionally execute the operations of the controller.

The description herein including modules emphasizes the structural independence of the aspects of the controller 128, and illustrates one grouping of operations and functions of the controller 128. Other groupings that execute similar overall operations are understood within the scope of the present application. Modules may be implemented in hardware and/or software on computer readable medium, and modules may be distributed across various hardware or software components. The operations of specific modules may be combined or divided in some embodiments. More specific descriptions of certain embodiments of controller 128 operations are included in the section referencing FIG. 2.

The controller 128 includes a test conditions module, a testing module, a monitoring module, and a catalyst aging module. The test conditions module interprets a test conditions event occurrence for the $NO_x$ reduction catalyst, the testing module commands a catalyst efficiency test in response to the test conditions event occurrence, the monitoring module interprets operating condition(s) indicative of a $NO_x$ conversion efficiency during the catalyst efficiency test, and the catalyst aging module determines a catalyst aging value in response to the at least one operating condition. In certain further embodiments, the controller 128 includes a feedforward catalyst aging module that interprets a catalyst aging parameter, and an aftertreatment regeneration module that intermittently performs a regeneration event to remove particulates from the particulate filter. The feedforward catalyst aging module further determines a feedforward catalyst aging value in response to the regeneration event, and the catalyst aging module adjusts the catalyst aging value in response to the feedforward catalyst aging value.

Figure 2:
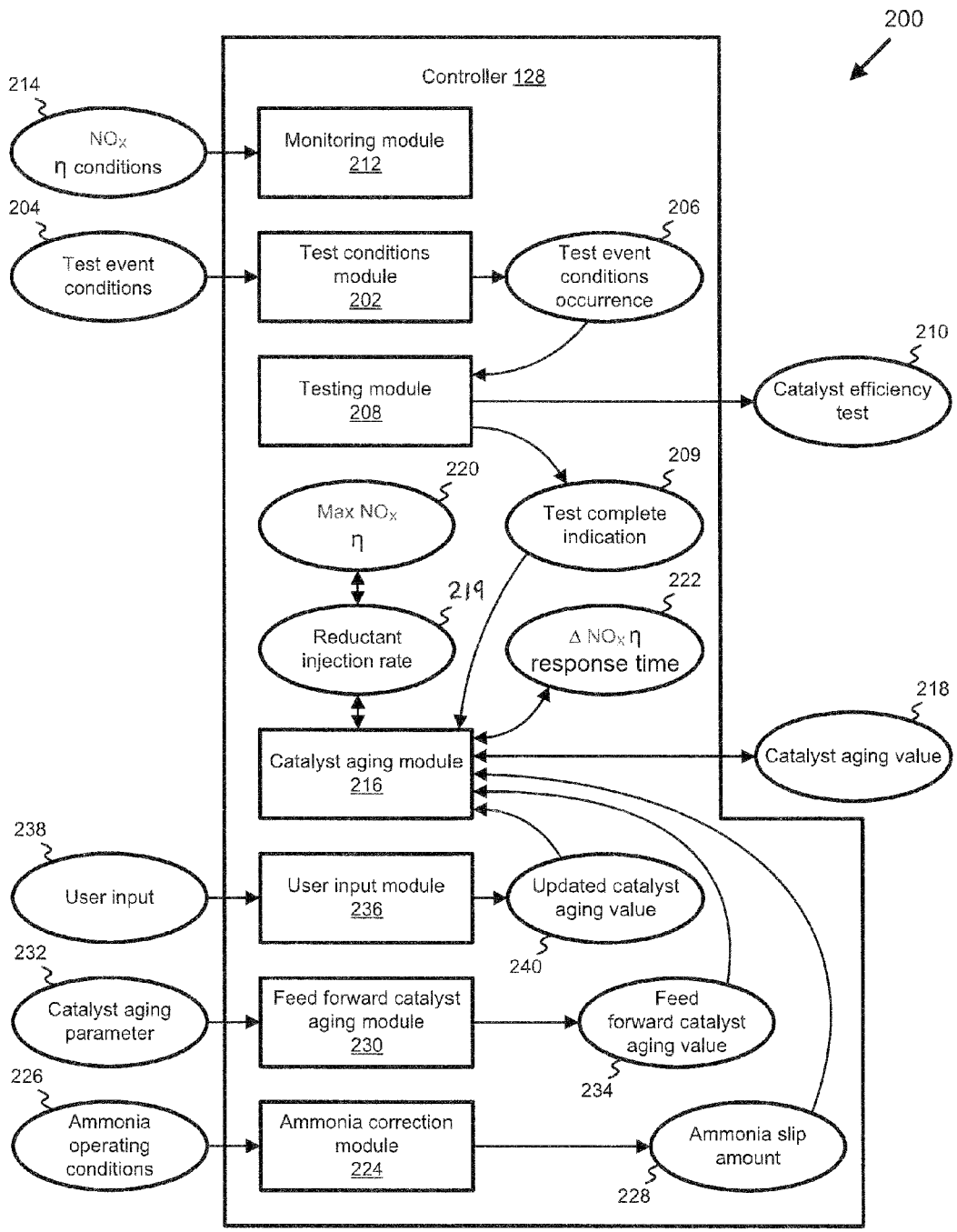
FIG. 2 is schematic block diagram of a processing subsystem for detecting catalyst degradation.

FIG. 2 is schematic block diagram of a processing subsystem 200 having a controller 128 for detecting catalyst degradation. The exemplary controller 128 includes a test conditions module 202, a testing module 208, a monitoring module 212, and a catalyst aging module 216. Any data parameter illustrated may: be read from a memory location on any device of the processing subsystem 200 including the controller 128 or other device, be communicated over a data link or network, and/or be a value calculated during run-time operations of the controller 128 or other processing device on the system 100 or in communication with the system 100. Additionally, data parameters are illustrated as being on the controller 128 or within the processing subsystem 200, but the positions of data parameters are for illustration only and are not limiting.

The test conditions module 202 interprets a test conditions event occurrence 206 for the $NO_x$ reduction catalyst 108. The test event conditions occurrence 206 is an indicator that general operating conditions of the system 100 are consistent with the potential completion of a catalyst degradation test. Interpreting the test conditions event occurrence 206 may be any known operation that determines whether a test conditions event occurrence 206 has occurred. Specific, non-limiting examples include reading a data parameter indicating that a test event conditions occurrence 206 is available, and/or monitoring data parameters indicative of test event conditions 204 and determining that the test event conditions 204 indicate a test event conditions occurrence 206 is available.

In one example, the test conditions event occurrence 206 includes an occurrence of test event conditions 204 wherein the $NO_x$ reduction catalyst 108 has substantially zero reductant (e.g. $NH_3$) stored. Substantially zero $NH_3$ includes any amount of $NH_3$ on the $NO_x$ reduction catalyst 108 that is stored under conditions wherein the amount of $NH_3$ released during a test is expected to be small enough to avoid obscuring the results of the test. It is known that for some $NO_x$ sensors, released $NH_3$ from the $NO_x$ reduction catalyst 108 is detected at least partially as $NO_x$, obscuring the results of the test.

For example, some $NO_x$ reduction catalysts 108 do not store significant amounts of $NH_3$ and the test event conditions occurrence 206 may be continuously TRUE (or other value indicating test conditions are present). Some $NO_x$ reduction catalysts 108 may store insignificant amounts of $NH_3$ above certain temperatures, or after spending an amount of time above certain temperatures. The test event conditions occurrence 206 may further include information about the transient nature of engine 102 operations, or other information known in the art to be indicative of whether a successful test for catalyst degradation is likely to be completed. In one example, the test event conditions occurrence 206 further includes a determination of whether an ammonia oxidation catalyst 110 is operating under conditions (e.g. temperature and/or exhaust gas composition) wherein the ammonia oxidation catalyst 110 is expected to efficiently oxidize ammonia. In another example, the test conditions event occurrence 206 includes an occurrence of conditions where the $NO_x$ reduction catalyst 108 $NH_3$ storage capacity is substantially saturated, and/or where the $NO_x$ reduction catalyst is at a steady state warm temperature.

Generally, the test conditions event occurrence 206 indicates a substantially empty $NO_x$ reduction catalyst 108 for tests that diagnose the storage capacity of the $NO_x$ reduction catalyst 108, and the test conditions event occurrence 206 indicates a substantially saturated $NO_x$ reduction catalyst 108 for tests that diagnose the $NO_x$ conversion efficiency. The described test conditions event occurrence 206 indications provide a convenient decoupling of reductant storage effects from the desired test data during operation of the test. However, it is possible to perform a storage capacity test from a substantially saturated $NO_x$ reduction catalyst 108 (e.g. allowing stored reductant to release over a period of time) and it is possible to perform a $NO_x$ conversion efficiency test from a $NO_x$ reduction catalyst 108 having substantially zero stored $NH_3$ (e.g. retaining conditions during the test wherein reductant is not stored during the test, and/or modeling the stored reductant and correcting the test data accordingly). The described test conditions event occurrence 206 indications are exemplary and not limiting.

The testing module 208 commands a catalyst efficiency test 210 in response to the test conditions event occurrence 206. The monitoring module 212 interprets operating condition(s) indicative of a $NO_x$ conversion efficiency during the catalyst efficiency test, or $NO_x$ η conditions 214. The $NO_x$ η conditions 214 include data utilized to determine or estimate the conversion efficiency of $NO_x$ on the $NO_x$ reduction catalyst. In one example, the $NO_x$ η conditions 214 include data from a $NO_x$ sensor 116 positioned upstream of the $NO_x$ reduction catalyst 108 and from a $NO_x$ sensor 112 positioned downstream of the $NO_x$ reduction catalyst 108 (and additionally downstream of an ammonia oxidation catalyst 110 in certain embodiments). The $NO_x$ conversion efficiency, in certain embodiments, is described in terms of mass or moles of $NO_x$ converted as a percentage of the total mass or moles of $NO_x$.

The catalyst efficiency test 210 commanded by the testing module 208 includes reductant injection rate commands for the reductant injector 126. The catalyst efficiency test 210 may further includes other commands or information, including without limitation, a notification to the processing subsystem 200 that a catalyst efficiency test is being performed, and requests for other operating conditions (e.g. temperatures, flow rates, composition values of the exhaust stream). In an exemplary embodiment, the catalyst efficiency test 210 includes a step change from a low reductant injection rate to a high reductant injection rate, where the low reductant injection rate may be zero or another low value. In another exemplary embodiment, the catalyst efficiency test 210 includes sweeping the reductant injection rate through a range of values. The same embodiment of the system 100 may include multiple types of catalyst efficiency tests 210, for example to determine different aspects of catalyst degradation (e.g. storage versus conversion efficiency). In another example, different types of catalyst efficiency tests 210 may be utilized to implement different tests according to which types of tests are allowed under the current test event conditions 204 (e.g. a single sweep of reductant injection rate values versus multiple sweeps where the engine 102 is considered to be in a more transient state that may not support the time required for multiple sweeps).

The catalyst aging module 216 determines a catalyst aging value 218 in response to the $NO_x$ η conditions 214. The catalyst aging value 218 may be determined from a maximum $NO_x$ η 220 observed during the catalyst efficiency test 210, and the maximum $NO_x$ η 220 may further be determined according to a corresponding reductant injection rate 219.

The catalyst aging value 218 may alternatively or additionally be determined according to a ΔNO$_x$ η response time 222.

For example, a step change or other controlled increase in reductant injection rate is introduced as the catalyst efficiency test 210, and NH$_3$ is stored on the substantially empty NO$_x$ reduction catalyst 108 at an early period of the test causing a reduced NO$_x$ conversion efficiency as the reductant being stored is not immediately available for conversion of NO$_x$. In the example, as the NO$_x$ reduction catalyst 108 fills available storage sites, the NO$_x$ conversion efficiency rises. In the provided example, a NO$_x$ catalyst with relatively low NH$_3$ storage remaining will experience a more rapid NO$_x$ conversion efficiency rise, allowing the catalyst aging module 216 to determine the catalyst aging value 218 to be determined according to the ΔNO$_x$ η response time 222.

The ΔNO$_x$ η response time 222 may be determined as a time value (e.g. in seconds) or as a time constant (i.e. the time required to rise a specified percentage of the total change expected). The total change of NO$_x$ η that is expected may be pre-loaded (e.g. as a calibration) or may be determined in real-time. The determination in real-time may be determined according to a recent observed high NO$_x$ η, a highest NO$_x$ η observed during the presently conducted catalyst efficiency test 210, or determined by any other procedure. Where the highest NO$_x$ η observed during the presently conducted catalyst efficiency test 210 is utilized, the catalyst aging module 216 may store time and NO$_x$ η data over a period, and back calculate the ΔNO$_x$ η response time 222 after the NO$_x$ η is observed to settle out for a period of time.

In another example, the catalyst efficiency test 210 includes sweeping a reductant injection rate through a range of values and determining a reductant injection rate corresponding to a high NO$_x$ conversion efficiency value. The catalyst aging module 216 determines the catalyst aging value 218 in the present example according to the reductant injection rate and/or the high NO$_x$ conversion efficiency value. For example, a non-degraded catalyst will tend to have a higher maximum NO$_x$ conversion efficiency value, and will tend to have the higher maximum NO$_x$ conversion efficiency value at a total higher injection rate than a degraded catalyst will experience. Simple data sampling can calibrate a number of NO$_x$ conversion efficiency values and/or total injection rate values corresponding to catalyst aging values 218, which may then be stored on the processing subsystem 200. The catalyst aging module 216 then interpolates and/or extrapolates a present catalyst aging value 218 from the number of NO$_x$ conversion efficiency values and/or total injection rate values corresponding to catalyst aging values 218 according to the observed maximum NO$_x$ η 220 and/or the reductant injection rate 1219 corresponding to the maximum NO$_x$ η 220. Therefore, in one example, the catalyst aging value 218 includes a function of at least one of the reductant injection rate 219 and the corresponding maximum NO$_x$ η value.

The controller 128 further includes an ammonia correction module 224 that determines an ammonia slip amount 228 and corrects the NO$_x$ conversion efficiency from the NO$_x$ η conditions 214 in response to the ammonia slip amount 228. For example, the ammonia correction module 224 interprets ammonia operating conditions 226 which include a set of operating conditions sufficient to determine the ammonia slip amount 228. The ammonia operating conditions 226 may include some or all of the parameters from a temperature of the exhaust flowpath 104 at various relevant positions, a flow rate of the exhaust gas, and an injection rate of reductant from the reductant injector 126. Operations determining the ammonia slip amount 228 include evaporation of the reductant, breakdown of the reductant to ammonia (e.g. urea to ammonia conversion), and the present conversion capacity of the ammonia oxidation catalyst based on the current temperature in the catalyst, potential degradation of the ammonia oxidation catalyst, and the space velocity of the fluid flow through the ammonia oxidation catalyst.

After the ammonia slip amount 228 is determined, the NO$_x$ conversion efficiency may be corrected according to the amount NO$_x$ detected at the NO$_x$ sensor 112 that is actually attributable to ammonia detected as NO$_x$ at the NO$_x$ sensor 112. For example, if the NOx sensor 112 determines that 30 units of NO$_x$ passed out of the NO$_x$ reduction catalyst 108 and 100 units entered the NO$_x$ reduction catalyst 108, the current NO$_x$ efficiency may nominally be determined to be 70%. However, if the ammonia correction module 224 determines that 15 units of NO$_x$ read at the NO$_x$ sensor 112 are actually due to the ammonia slip amount 228 (e.g. 17 units of ammonia slipped, with the NO$_x$ sensor 112 reading 90% of the ammonia as NO$_x$), then the ammonia correction module 224 in the example corrects the NO$_x$ conversion efficiency to 85% (i.e. 15 units of NO$_x$ pass out of the NO$_x$ reduction catalyst 108 rather than 30). The effect of ammonia slip on the NO$_x$ sensor 112 may be provided by the sensor manufacturer and/or determined by simple data sampling of the system 100 in controlled conditions.

The controller 128 further includes a feedforward catalyst aging module 230 that interprets a catalyst aging parameter 232. The feedforward catalyst aging module 230 further determines a feedforward catalyst aging value 234 in response to the catalyst aging parameter 232, and the catalyst aging module 216 adjusts the catalyst aging value 218 in response to the feedforward catalyst aging value 234. The catalyst aging parameter 232 includes any information in the system 100 that is estimated to affect the degradation of the NO$_x$ reduction catalyst 108.

For example, the catalyst aging parameter 232 may be a temperature of the NO$_x$ reduction catalyst 108, and an integrator or simple counter/timer may accumulate estimated damage to the NO$_x$ reduction catalyst 108 based on the temperature. For example, a counter/timer may accumulate time spent over 500° C. in one embodiment, and a calibration table may determine the estimated damage to the catalyst based on time above 500° C. In another example, the damage to the NO$_x$ reduction catalyst 108 may comprise an increasing function at temperatures above a threshold, and in one embodiment the function may be exponentially increasing (e.g. the rate of damage doubles each 50° C. above a threshold value); an integrator may be utilized to accumulate the damage where the feedforward catalyst aging value 234 is a function of temperature. The temperature thresholds for damage accumulated to the NO$_x$ reduction catalyst 108 and the rates of damage increase according to temperature are values that can be determined through field experience with a given system 100 and/or by simple data sampling to produce a calibration table. In one example, the catalyst aging parameter 232 is a counter accumulating a total number of regeneration events that have occurred for a system 100 component, for example the particulate filter 114. In the example, the NO$_x$ reduction catalyst 108 may be estimated to accumulate a certain amount of damage (feedforward catalyst aging value 234) for each regeneration event, and/or to achieve certain damage values at certain regeneration event thresholds.

The catalyst aging module 216 may utilize the feedforward catalyst aging value 234 to determine the catalyst aging value 218, and/or to adjust the catalyst aging value 218 between successful test completion indications 209. For example, the catalyst aging module 216 may adjust the catalyst aging value 218 in response to the testing module 208 providing a test complete indication 209 according to the catalyst aging determined by the test. The adjustment of the catalyst aging value 218 in response to the testing module 208 providing a test complete indication 209 according to the catalyst aging determined by the test may be a reset or partial reset of the catalyst aging value 218 to a catalyst aging value determined by the successful test. The catalyst aging module 216 may further adjust the catalyst aging value 218 in response to the feedforward catalyst aging value 234 between test complete indications 209. For example, a first test completion 209 may indicate a catalyst aging value 218 of "100", and adjustments due to the feedforward catalyst aging value 234 between tests may have moved the catalyst aging value 218 to "125." In the example, a second test completion 209 may indicate a catalyst aging value 218 of "112," and the catalyst aging module 216 then resets the catalyst aging value 218 to a number between "125" and "112" inclusive, including resetting the catalyst aging value 218 completely to "112."

The controller 128 includes a user input module 236 that interprets a user input 238 and provides an updated catalyst aging value 240. The catalyst aging module 216 adjusts the catalyst aging value 218 in response to the updated catalyst aging value 240. The adjustment of the catalyst aging value 218 in response to the updated catalyst aging value 240 may be complete or partial. In one example, a maintenance operation involves replacing a $NO_x$ reduction catalyst 108, and a technician utilizes the user input 238 to provide an updated catalyst aging value 240 that resets the catalyst aging value 218 to a value consistent with a new catalyst. In another example, the aftertreatment system 106 is removed from a first vehicle (not shown) to a second vehicle (not shown), where the controller 128 from the first vehicle is not moved over with the aftertreatment system 106. An installer utilizes the user input 238 to provide a controller 128 in the second vehicle with the proper catalyst aging value 218 for the $NO_x$ reduction catalyst 108 that was moved with the aftertreatment system 106. The provided examples are non-limiting, and any utilization of the user input 238 and operations of the user input module 236 are contemplated herein.

Figure 3:
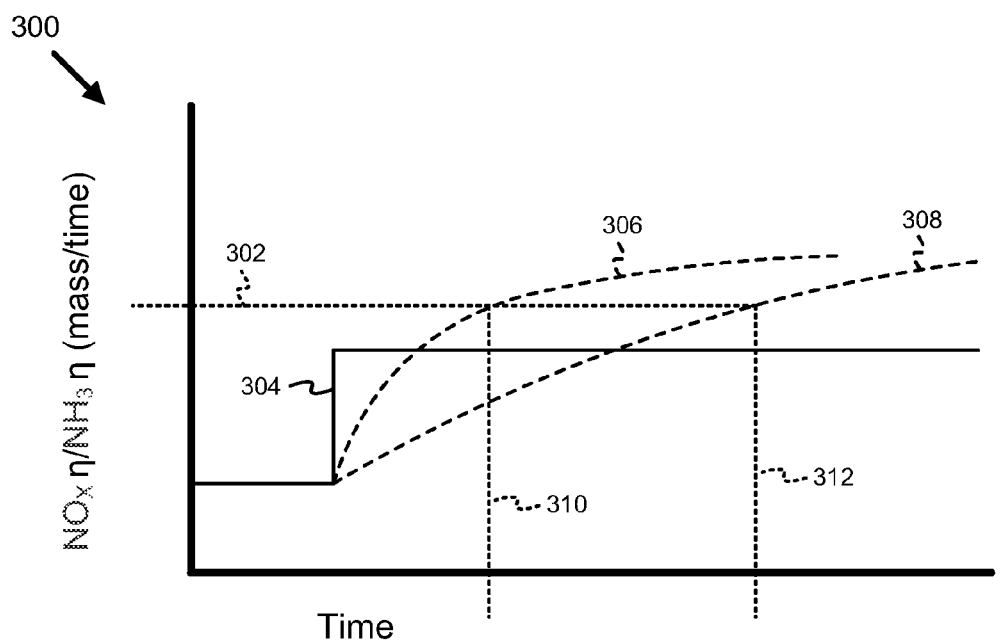
FIG. 3 is an illustration of example catalyst storage determination data.

FIG. 3 is an illustration of example catalyst storage determination data 300. A first curve 304 illustrates a reductant injection rate, reflecting a step change in the reductant injection rate. A second curve 306 provides an observed $NO_x$ conversion efficiency for a relatively degraded catalyst (i.e. having relatively low reductant storage capacity), which rises to a threshold conversion efficiency 302 at a first time value 310. A third curve 308 provides an observed $NO_x$ conversion efficiency for a relatively non-degraded catalyst (i.e. having a relatively high reductant storage capacity), which rises to the threshold conversion efficiency 302 at a second time value 312. The degraded and non-degraded catalysts are illustrated rising to the same final $NO_x$ conversion efficiency to simplify the illustration, but the catalysts may have differing final $NO_x$ conversion efficiency values. The curves 306, 308 may represent calibration data or observed data during a catalyst efficiency test 210. The time value observed during a test may be compared to the time values 310, 312 to determine a current aging state of a catalyst. The threshold conversion efficiency 302 is a function of the final $NO_x$ conversion efficiency value and a starting final $NO_x$ conversion efficiency value. For example, if the time values 310, 312 is selected to be one time constant, the threshold conversion efficiency 302 is at a value where about 63% of the change in $NO_x$ conversion efficiency has occurred from the starting $NO_x$ conversion efficiency to the final $NO_x$ conversion efficiency.

Figure 4:
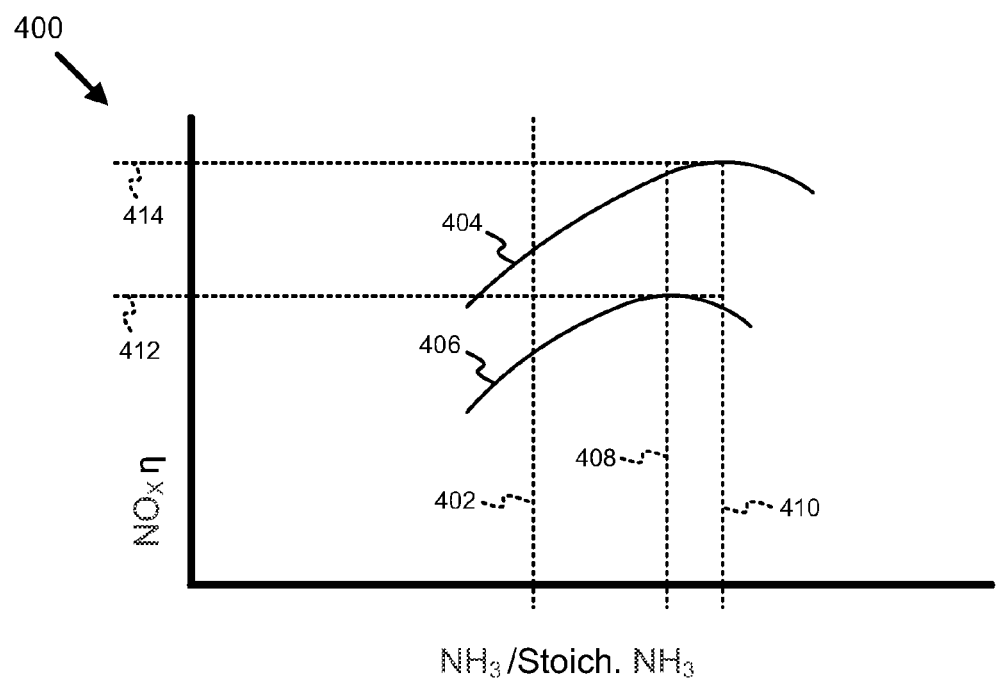
FIG. 4 is an illustration of example catalyst conversion efficiency determination data.

FIG. 4 is an illustration of example catalyst conversion efficiency determination data 400. A first curve 404 illustrates a $NO_x$ conversion efficiency in a relatively non-degraded catalyst observed over a range of reductant injection rates, where the reductant injection rates are described in terms of an amount of ammonia injected as a ratio of the stoichiometric amount of ammonia to convert the available $NO_x$ in the exhaust stream. A second curve 406 illustrates a $NO_x$ conversion efficiency in a relatively degraded catalyst observed over a range of reductant injection rates.

A nominal injection rate 402 at stoichiometric is shown, to illustrate that most systems have a maximum $NO_x$ conversion efficiency at a reductant injection rate higher than stoichiometric. A first maximum $NO_x$ conversion efficiency 414 corresponding to a first injection rate 410 is illustrated, and a second maximum $NO_x$ conversion efficiency 412 corresponding to a second injection rate 408 is further illustrated. In the example, the more degraded catalyst experiences a lower maximum $NO_x$ conversion efficiency 412 and at a lower injection rate 408. The injection rate for the degraded catalyst corresponding to the maximum $NO_x$ conversion efficiency may be lower or higher than a non-degraded catalyst, and the relationship is readily determined with data sampling as illustrated in FIG. 4. Curves such as those illustrated in FIG. 4 are readily constructed for a $NO_x$ reduction catalyst 108 at any selected age or degradation value, and allow calibration of catalyst aging based on the maximum $NO_x$ conversion efficiency, the reductant injection rate corresponding to the maximum $NO_x$ conversion efficiency, or both.

The schematic flow diagram and related description which follows provides an illustrative embodiment of performing procedures for determining catalyst degradation values. Operations illustrated are understood to be exemplary only, and operations may be combined or divided, and added or removed, as well as re-ordered in whole or part, unless stated explicitly to the contrary herein.

Figure 5:
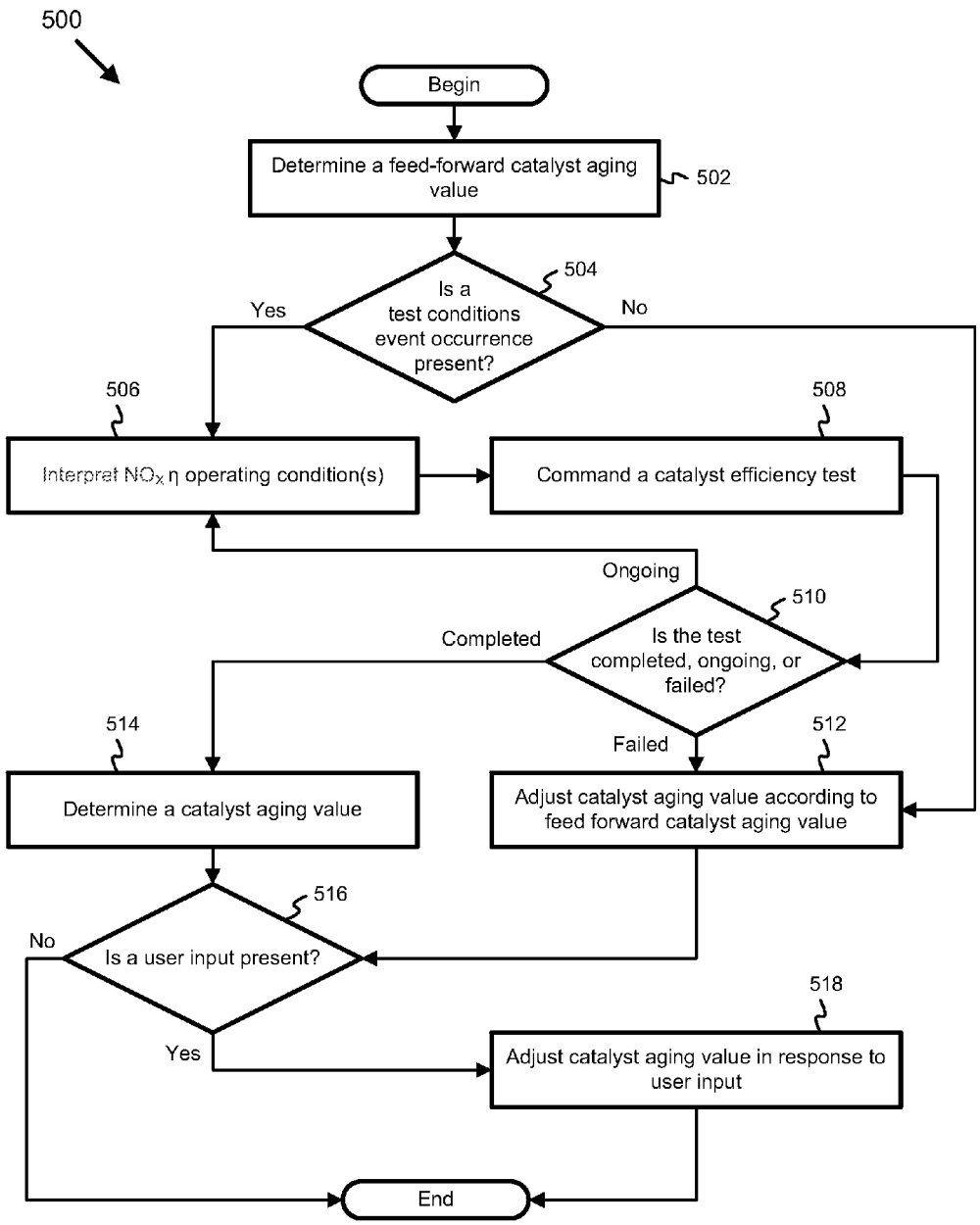
FIG. 5 is schematic flow diagram of a procedure for detecting catalyst degradation.

FIG. 5 is schematic flow diagram of a procedure 500 for determining catalyst degradation. The procedure 500 includes an operation 502 to determine a feedforward catalyst aging value and an operation 504 to determine whether a test conditions event occurrence is present.

In response to the operation 504 determining that a test conditions event occurrence is present, the procedure 500 includes an operation 506 to interpret $NO_x$ operating conditions and an operation 508 to command a catalyst efficiency test. The procedure 500 further includes an operation 510 to determine whether the catalyst efficiency test is completed, ongoing, or failed. In response to the operation 510 determining that the catalyst efficiency test is ongoing, the procedure 500 includes operations 506, 508 to continue monitoring and commanding the test until the test completes or fails.

In response to the operation 510 determining the test has failed, and/or in response to the operation 504 determining that a test conditions event occurrence is not present, the procedure 500 includes an operation 512 to adjust a catalyst aging value according to a feedforward catalyst aging value. In response to the operation 510 determining the test has completed, the procedure 500 further includes an operation 514 to determine the catalyst aging value. The procedure 500 further includes an operation 516 to determine whether a user input is present, and an operation 518 to adjust the catalyst aging value in response to a determination that the user input is present.

As is evident from the figures and text presented above, a variety of embodiments according to the present invention are contemplated.

An exemplary embodiment includes an apparatus having a test conditions module, a testing module, a monitoring module, and a catalyst aging module. The test conditions module interprets a test conditions event occurrence for a $NO_x$ reduction catalyst, the testing module commands a catalyst efficiency test in response to the test conditions event occurrence, the monitoring module interprets operating condition(s) indicative of a $NO_x$ conversion efficiency during the catalyst efficiency test, and the catalyst aging module determines a catalyst aging value in response to the operating condition(s). In certain embodiments, the test conditions event occurrence includes an occurrence of conditions wherein the $NO_x$ reduction catalyst has substantially zero reductant (e.g. $NH_3$) stored, and the catalyst efficiency test may further include a step change in the reductant injection rate. In a further embodiment, the catalyst aging module determines the catalyst aging value in response to a response time of a $NO_x$ conversion efficiency change after the step change. The step change may be a change from a zero rate to a high rate.

In one embodiment, the catalyst efficiency test includes sweeping a reductant injection rate through a range of values and determining a reductant injection rate corresponding to a high $NO_x$ conversion efficiency value. In a further embodiment, the test conditions event occurrence includes an occurrence of conditions where the $NO_x$ reduction catalyst $NH_3$ storage capacity is substantially saturated, and/or where the $NO_x$ reduction catalyst is at a steady state warm temperature. In one example, the catalyst aging value includes a function of at least one of the reductant injection rate and the corresponding high $NO_x$ conversion efficiency value.

The apparatus includes, in a further embodiment, an ammonia oxidation catalyst downstream of the $NO_x$ reduction catalyst and a $NO_x$ sensor downstream of the ammonia oxidation catalyst. The apparatus further includes an ammonia correction module that determines an ammonia slip amount and corrects the $NO_x$ conversion efficiency in response to the ammonia slip amount. The apparatus further includes a feedforward catalyst aging module that interprets a catalyst aging parameter, where the feedforward catalyst aging module further determines a feedforward catalyst aging value in response to the catalyst aging parameter, and the catalyst aging module adjusts the catalyst aging value in response to the feedforward catalyst aging value. The catalyst aging module is further structured to adjust the catalyst aging value in response to at least one of the following events: a user input module interprets a user input and provides an updated catalyst aging value in response to the user input, and/or the testing module provides an indication that a successful test is completed.

Another exemplary embodiment is a method including interpreting a test conditions event occurrence for a $NO_x$ reduction catalyst, commanding a catalyst efficiency test in response to the test conditions event occurrence, interpreting at least one operating condition indicative of a $NO_x$ conversion efficiency during the catalyst efficiency test, and determining a catalyst aging value in response to the at least one operating condition. In a further embodiment, the commanding a catalyst efficiency test includes inducing a step change in a reduction injection rate, and determining the catalyst aging value in response to a response time of a $NO_x$ conversion efficiency change after the step change. Commanding a catalyst efficiency test includes sweeping a reductant injection rate through a range of values and determining a reductant injection rate corresponding to a high $NO_x$ conversion efficiency value.

The exemplary method further includes determining a feedforward catalyst aging value in response to a catalyst aging parameter, and adjusting the catalyst aging value in response to the feedforward catalyst aging value. In a further embodiment, the method includes resetting the catalyst aging value in response to one of a user input and a successfully completed catalyst efficiency test.

An exemplary embodiment is a system, including an internal combustion engine fluidly coupled to an exhaust gas flowpath, an aftertreatment system disposed in the exhaust gas flowpath, where the aftertreatment system includes a $NO_x$ reduction catalyst. The exemplary system includes a processing subsystem having a controller, where the controller includes modules structured to functionally execute operations for determining a catalyst degradation. The modules include a test conditions module, a testing module, a monitoring module, and a catalyst aging module. The test conditions module interprets a test conditions event occurrence for the $NO_x$ reduction catalyst, the testing module commands a catalyst efficiency test in response to the test conditions event occurrence, the monitoring module interprets operating condition(s) indicative of a $NO_x$ conversion efficiency during the catalyst efficiency test, and the catalyst aging module determines a catalyst aging value in response to the at least one operating condition.

The system further includes an ammonia oxidation catalyst downstream of the $NO_x$ reduction catalyst and a $NO_x$ sensor downstream of the ammonia oxidation catalyst, and an ammonia correction module that determines an ammonia slip amount and corrects the $NO_x$ conversion efficiency in response to the ammonia slip amount.

In a further embodiment, the system includes a feedforward catalyst aging module that interprets a catalyst aging parameter, and the system further includes: a particulate filter disposed in the exhaust flowpath and an aftertreatment regeneration module that intermittently performs a regeneration event to remove particulates from the particulate filter. The feedforward catalyst aging module further determines a feedforward catalyst aging value in response to the regeneration event, and the catalyst aging module adjusts the catalyst aging value in response to the feedforward catalyst aging value.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
   an electronic controller including a plurality of modules configured to determine degradation of a $NO_x$ reduction catalyst, wherein the plurality of modules include:
   a test conditions module structured to interpret a test conditions event occurrence for the $NO_x$ reduction catalyst;
   a testing module structured to command a catalyst efficiency test in response to the test conditions event occurrence and wherein the catalyst efficiency test includes a step change in a reductant injection rate;

a monitoring module structured to interpret at least one operating condition indicative of a $NO_x$ conversion efficiency during the catalyst efficiency test; and
a catalyst aging module structured to determine a catalyst aging value in response to the at least one operating condition.

2. The apparatus of claim 1, further comprising an ammonia oxidation catalyst downstream of the $NO_x$ reduction catalyst and a $NO_x$ sensor downstream of the ammonia oxidation catalyst.

3. The apparatus of claim 1, wherein the test conditions event occurrence comprises an occurrence of conditions wherein the $NO_x$ reduction catalyst has substantially zero $NH_3$ stored.

4. The apparatus of claim 3, wherein the catalyst aging module determines the catalyst aging value in response to a response time of a $NO_x$ conversion efficiency change after the step change.

5. The apparatus of claim 4, wherein the step change in the reductant injection rate comprises a change from a zero rate to a high rate.

6. An apparatus, comprising:
an electronic controller including a plurality of modules configured to determine degradation of a $NO_x$ reduction catalyst, wherein the plurality of modules include:
a test conditions module structured to interpret a test conditions event occurrence for the $NO_x$ reduction catalyst;
a testing module structured to command a catalyst efficiency test in response to the test conditions event occurrence and wherein the catalyst efficiency test comprises sweeping a reductant injection rate through a range of values and determining a reductant injection rate corresponding to a high $NO_x$ conversion efficiency value;
a monitoring module structured to interpret at least one operating condition indicative of the high $NO_x$ conversion efficiency value during the catalyst efficiency test; and
a catalyst aging module structured to determine a catalyst aging value in response to the at least one operating condition.

7. The apparatus of claim 6, wherein the test conditions event occurrence comprises an occurrence of conditions wherein one of:
the $NO_x$ reduction catalyst $NH_3$ storage capacity is substantially saturated; and
the $NO_x$ reduction catalyst is at a steady state warm temperature.

8. The apparatus of claim 6, wherein the catalyst aging value comprises a function of at least one of the reductant injection rate and the corresponding high $NO_x$ conversion efficiency value.

9. An apparatus, comprising:
an electronic controller including a plurality of modules configured to determine degradation of a $NO_x$ reduction catalyst, wherein the plurality of modules include:
a test conditions module structured to interpret a test conditions event occurrence for the $NO_x$ reduction catalyst;
a testing module structured to command a catalyst efficiency test in response to the test conditions event occurrence;
a monitoring module structured to interpret at least one operating condition indicative of a $NO_x$ conversion efficiency during the catalyst efficiency test;
a catalyst aging module structured to determine a catalyst aging value in response to the at least one operating condition; and
an ammonia correction module structured to determine an ammonia slip amount and to correct the $NO_x$ conversion efficiency in response to the ammonia slip amount.

10. An apparatus, comprising:
an electronic controller including a plurality of modules configured to determine degradation of a $NO_x$ reduction catalyst, wherein the plurality of modules include:
a test conditions module structured to interpret a test conditions event occurrence for the $NO_x$ reduction catalyst;
a testing module structured to command a catalyst efficiency test in response to the test conditions event occurrence;
a monitoring module structured to interpret at least one operating condition indicative of a $NO_x$ conversion efficiency during the catalyst efficiency test;
a catalyst aging module structured to determine a catalyst aging value in response to the at least one operating condition; and
wherein a feedforward catalyst aging module is structured to interpret a catalyst aging parameter, the feedforward catalyst aging module further structured to determine a feedforward catalyst aging value in response to the catalyst aging parameter, and wherein the catalyst aging module adjusts the catalyst aging value in response to the feedforward catalyst aging value.

11. The apparatus of claim 10, wherein the catalyst aging module is further structured to adjust the catalyst aging value in response to at least one event selected from the events consisting of:
a user input module interprets a user input and provides an updated catalyst aging value in response to the user input; and
the testing module provides an indication that a successful test is completed.

12. A method, comprising:
interpreting a test conditions event occurrence for a $NO_x$ reduction catalyst;
commanding a catalyst efficiency test in response to the test conditions event occurrence and inducing a step change in a reductant injection rate;
interpreting at least one operating condition indicative of a NOx conversion efficiency during the catalyst efficiency test; and
determining a catalyst aging value in response to a response time of a $NO_x$ conversion efficiency change after the step change.

13. A method, comprising:
interpreting a test conditions event occurrence for a $NO_x$ reduction catalyst;
commanding a catalyst efficiency test in response to the test conditions event occurrence and sweeping a reductant injection rate through a range of values;
interpreting at least one operating condition indicative of a $NO_x$ conversion efficiency during the catalyst efficiency test;
determining a catalyst aging value in response to the at least one operating condition; and
determining a reductant injection rate corresponding to a high $NO_x$ conversion efficiency value.

14. A method, comprising:
interpreting a test conditions event occurrence for a $NO_x$ reduction catalyst;
commanding a catalyst efficiency test in response to the test conditions event occurrence and inducing a step change in a reductant injection rate;

interpreting at least one operating condition indicative of a NOx conversion efficiency during the catalyst efficiency test; and determining a catalyst aging value in response to the at least one operating condition; and determining a feedforward catalyst aging value in response to a catalyst aging parameter, and adjusting the catalyst aging value in response to the feedforward catalyst aging value.

15. The method of claim 14, further comprising resetting the catalyst aging value in response to one of a user input and a successfully completed catalyst efficiency test.

16. A system, comprising:
an internal combustion engine fluidly coupled to an exhaust gas flowpath;
an aftertreatment system disposed in the exhaust gas flowpath, the aftertreatment system comprising a $NO_x$ reduction catalyst;
an electronic controller including a plurality of modules configured to determine degradation of the $NO_x$ reduction catalyst, wherein the plurality of modules include:
a test conditions module structured to interpret a test conditions event occurrence for the $NO_x$ reduction catalyst;
a testing module structured to command a catalyst efficiency test in response to the test conditions event occurrence and wherein the catalyst efficiency test includes a step change in a reductant injection rate;
a monitoring module structured to interpret at least one operating condition indicative of a $NO_x$ conversion efficiency during the catalyst efficiency test; and
a catalyst aging module structured to determine a catalyst aging value in response to the at least one operating condition.

17. The system of claim 16, further comprising an ammonia oxidation catalyst downstream of the $NO_x$ reduction catalyst and a $NO_x$ sensor downstream of the ammonia oxidation catalyst, the system further comprising an ammonia correction module structured to determine an ammonia slip amount and to correct the NOx conversion efficiency in response to the ammonia slip amount.

18. The system of claim 16, wherein a feedforward catalyst aging module is structured to interpret a catalyst aging parameter, the system further comprising:
a particulate filter disposed in the exhaust flowpath;
an aftertreatment regeneration module that intermittently performs a regeneration event to remove particulates from the particulate filter; and
the feedforward catalyst aging module further structured to determine a feedforward catalyst aging value in response to the regeneration event, and wherein the catalyst aging module adjusts the catalyst aging value in response to the feedforward catalyst aging value.

* * * * *